(No Model.) 5 Sheets—Sheet 2.

C. E. ROBERTS.
MACHINE FOR THREADING BUNG BUSHES.

No. 277,160. Patented May 8, 1883.

Witnesses:
O. W. Bond
Albert H. Adams

Inventor:
Charles E. Roberts (No Model.) 5 Sheets—Sheet 3.
C. E. ROBERTS.
MACHINE FOR THREADING BUNG BUSHES.
No. 277,160. Patented May 8, 1883.
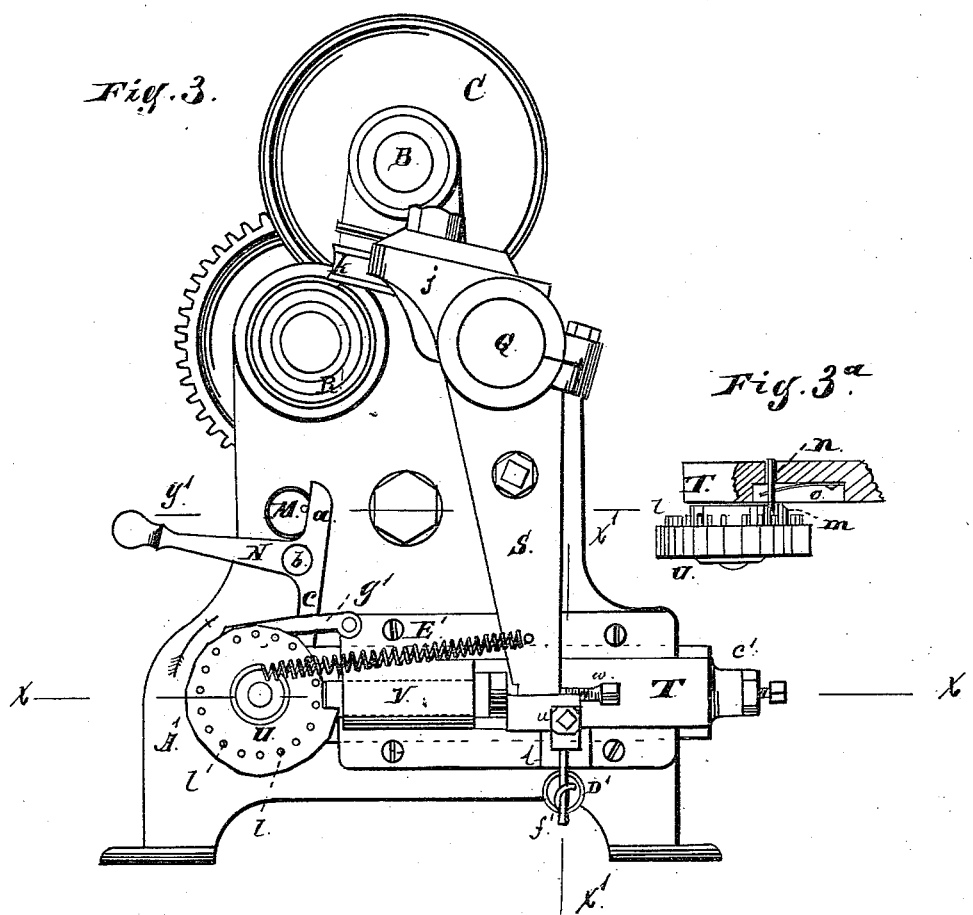
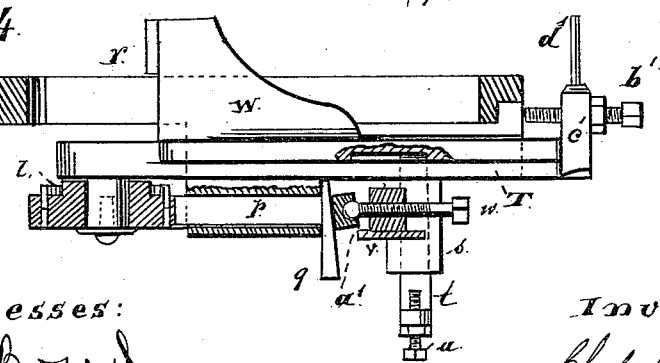

(No Model.) 5 Sheets—Sheet 4.
C. E. ROBERTS.
MACHINE FOR THREADING BUNG BUSHES.
No. 277,160. Patented May 8, 1883.
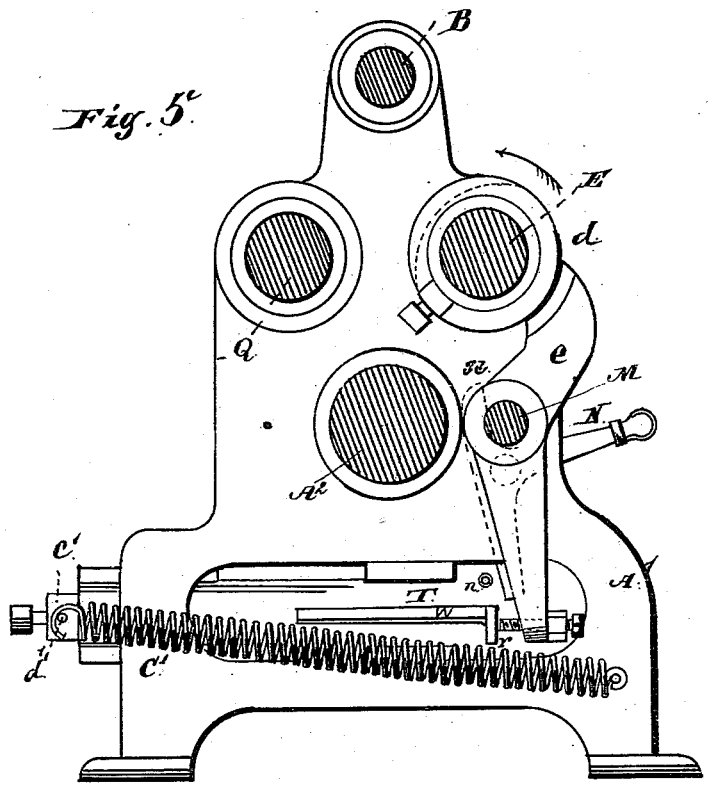
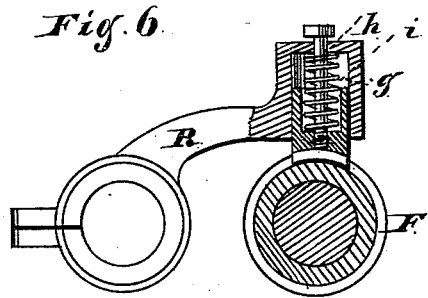
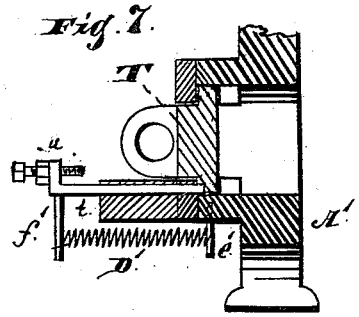
Witnesses:
O. W. Bond
Albert H. Adams
Inventor:
Charles E. Roberts (No Model.)  
5 Sheets—Sheet 5.
C. E. ROBERTS.
MACHINE FOR THREADING BUNG BUSHES.
No. 277,160.  Patented May 8, 1883.
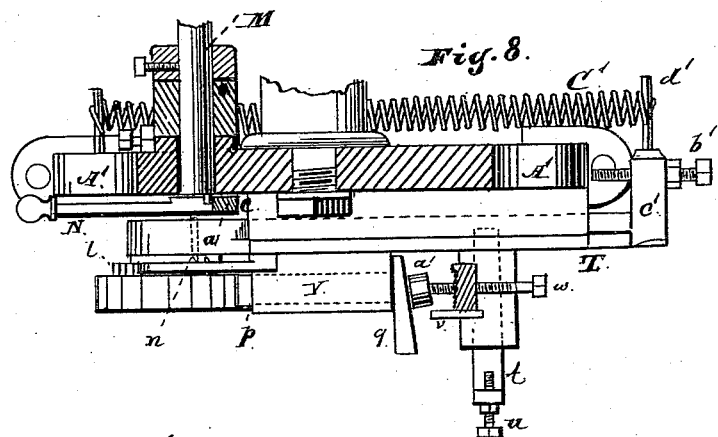
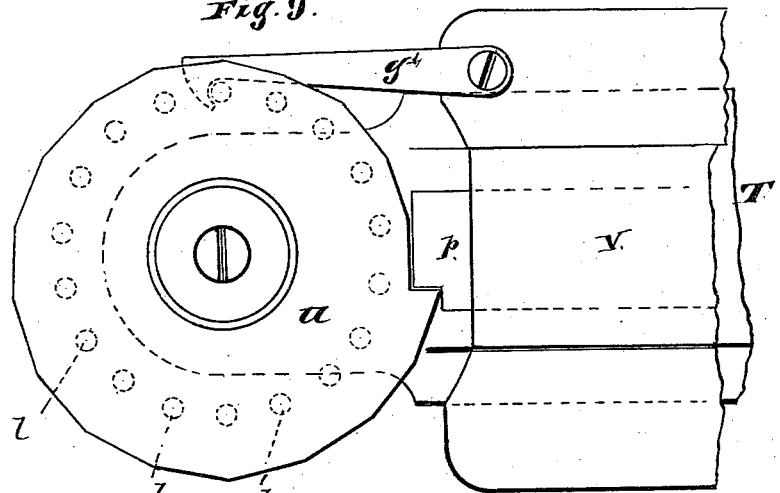
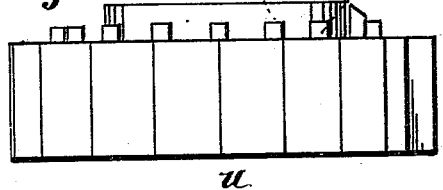
Witnesses:
O. W. Bond
Albert H. Adams
Inventor:
Charles E. Roberts

UNITED STATES PATENT OFFICE.

CHARLES E. ROBERTS, OF CHICAGO, ILLINOIS, ASSIGNOR TO THE CRANE BROTHERS MANUFACTURING COMPANY, OF SAME PLACE.

MACHINE FOR THREADING BUNG-BUSHES.

SPECIFICATION forming part of Letters Patent No. 277,160, dated May 8, 1883.

Application filed October 3, 1881. (No model.)

*To all whom it may concern:*

Be it known that I, CHARLES E. ROBERTS, residing at Chicago, in the county of Cook and State of Illinois, and a citizen of the United States, have invented a new and useful Improvement in Machines for Threading Bung-Bushes, of which the following is a full description, reference being had to the accompanying drawings, in which—

Figure 1:
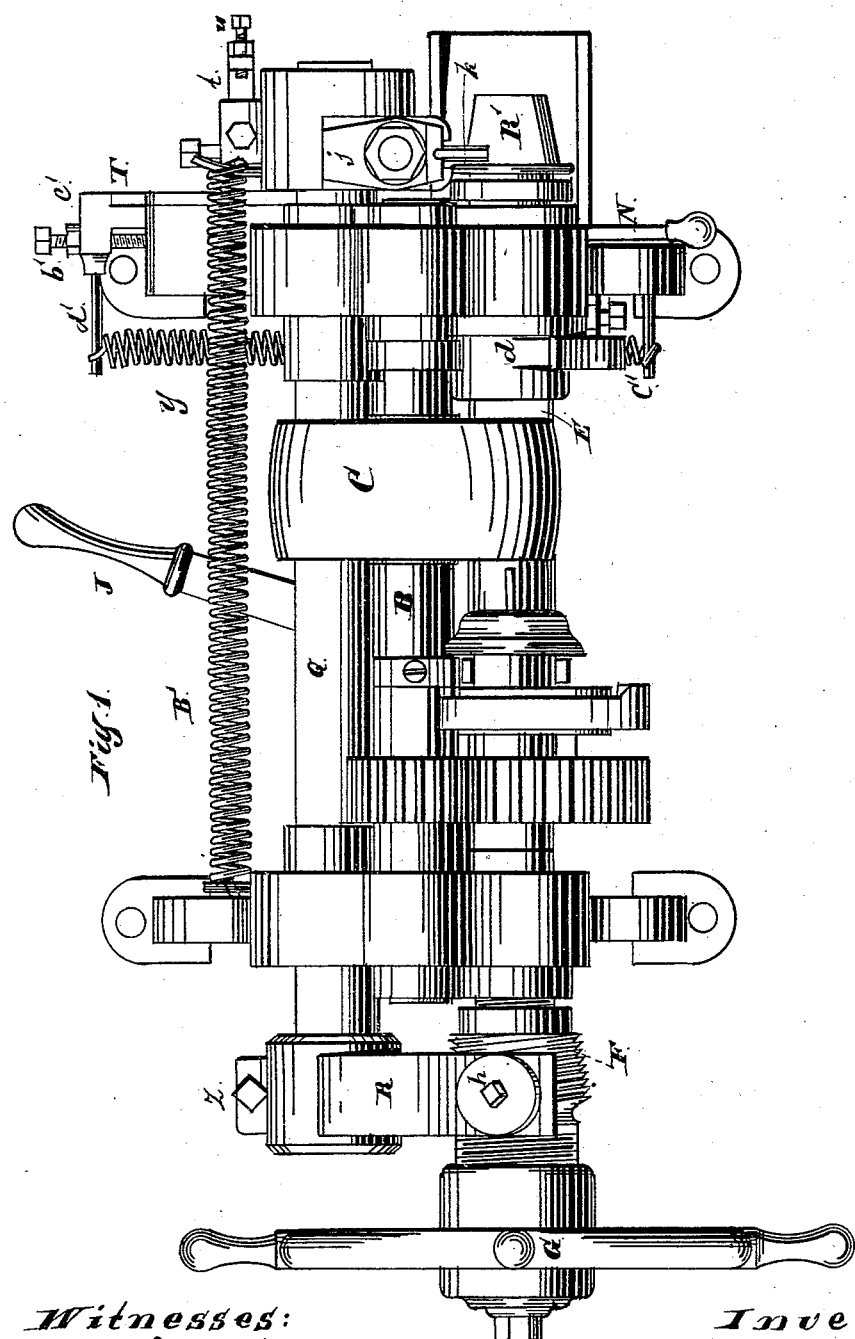
Figure 2:
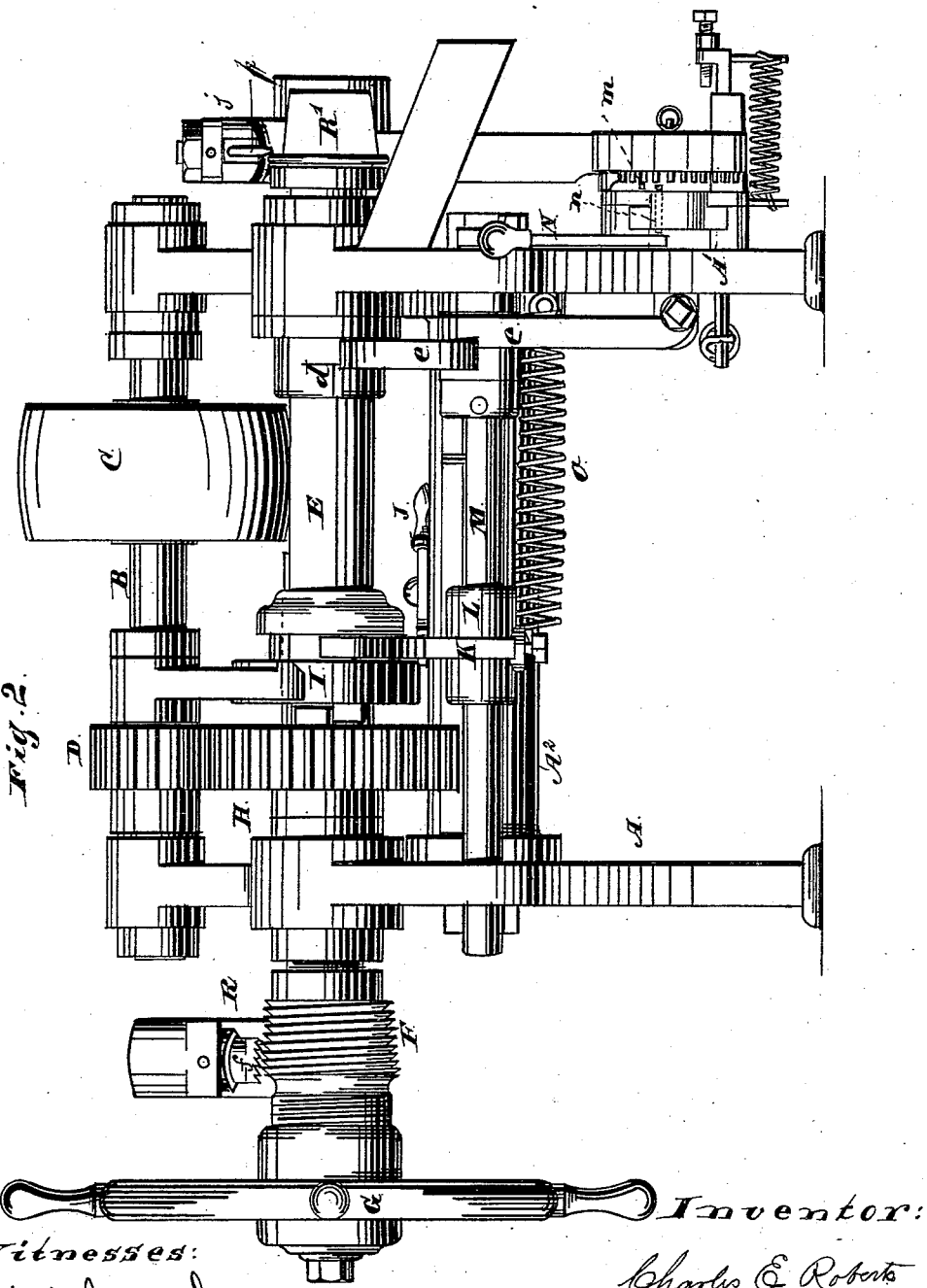

Figure 1 is a top view. Fig. 2 is a side elevation. Fig. 3 is an end elevation. Fig. 3$^a$ is a detail. Fig. 4 is a detail, being a section at or near line $x$ of Fig. 3, looking down. Fig. 5 is a section taken at line $y$ of Fig. 1, looking to the right. Fig. 6 is a detail, a part of the same being in section at line $z$ of Fig. 1. Fig. 7 is a detail, being a section at line $x'$ of Fig. 3. Fig. 8 is a detail, being a horizontal section at line $y'$ of Fig. 3. Figs. 9 and 10 are enlarged details.

The object of my invention is to construct improved devices to be used in cutting screw-threads on metals. The machine which I have shown in the drawings is especially designed to be used in cutting screw-threads upon the exterior of bung-bushes; but the machine is, or with slight mechanical changes may be, adapted to other uses.

The leading novel features in my invention are found in devices which by their action automatically provide for repeated cuttings in order to give the required depth to the thread.

In the drawings, A A' represent the standards of a suitable frame in which the parts are supported, said standards being rigidly united and held in fixed relative positions by a substantial connecting-bar, A$^2$.

B is a shaft supported in suitable bearings, which carries a driving-pulley, C, and a small gear-wheel, D.

E is a shaft supported in suitable bearings, one end of which is adapted to receive the bushes upon which screw-threads are to be cut, R' being one of such bushes upon such end of the shaft E.

F is a leading-screw keyed to the shaft or spindle E.

G is a hand-wheel upon that end of the spindle or shaft E opposite to the end which carries the bush. This spindle or shaft E is hollow, and in it is a device for expanding the end of the spindle which carries the bush. The devices for accomplishing this are well known, and I have not shown them in the drawings.

H is a cog-wheel which engages with the cog-wheel D. This wheel H is loose upon the shaft E.

I is a clutch on the shaft E. The clutch can be engaged with the wheel H.

K is a fork which engages with the clutch I, and is operated by a lever, J. This fork is connected to a hub, L, secured to the shaft M, which has a longitudinal movement in its bearings in the standards A A'. When the clutch is engaged with the wheel H the end of this shaft M which is in the standard A' will be on a line with the outside of such standard A', and it will be held there by the weighted lever N, one arm, $a$, of such lever being then partially over the end of the shaft M, as shown in Fig. 3. This weighted lever is pivoted to the machine at $b$, and has a second arm, $c$, extending downward.

O is a strong spring, one end of which is attached to the lower end of the fork K and the other end to the standard A'.

$d$ is an eccentric or cam upon the shaft E.

$e$ is a lever pivoted upon a sleeve which is secured to the frame or standard A', through which sleeve the shaft M moves. The upper end of this lever engages with the cam $d$, the lower end being free.

Q is a chasing-bar, which has a limited longitudinal movement, and also a limited rocking or rotating movement in its bearings.

R is an arm secured to one end of the bar or rod Q. This arm carries a follower, $f$, which may be called a section or part of a nut, having its threads engaging with and corresponding with the threads upon the leading-screw F. This follower is located in a chamber in a head, $g$, upon the end of the arm R. The follower $f$ has a rod or pin, $h$, secured to it, which pin $h$ passes up through the chamber $g$ and through its top, as shown in Fig. 6. Within this chamber $g$, and encircling the pin $h$, is a coil-spring, $i$, arranged to yield as the follower $f$ moves vertically in its chamber $g$. On the opposite end of the chasing rod or bar Q is secured a head, $j$, which carries a cutter, $k$. Connected with this head and extending downward therefrom is an arm or lever, S, the head $j$ and arm or lever S being connected together, and both being secured firmly to the end of the chasing-bar Q.

T is a sliding piece moving in suitable guide-ways in or upon the standard A'.

U is an eccentric and many-sided wheel, which is pivoted on the outside and at one end of the slide T. In this wheel are a number of pins, $l$, projecting a little way from the inside of the wheel U, the pins corresponding in number with the number of sides or faces on the wheel U. One of the pins, $m$, is longer than the others, and its end is beveled. (See Fig. 3$^a$.)

In the slide T is a loose pin, $n$, having one end beveled, and arranged so that the end of the pin $m$ will at a certain time come in contact with it. This pin $n$ is held in the position shown in Fig. 3$^a$ except when forced inward by the action of the pin $m$. It is thus held in and returned to place by the small spring $o$, which is located in a recess in the slide T. This pin is so located and arranged that when it is forced inward by the pin $m$ the projecting end on the inside of the slide T will then be in position to engage with the lower end of the arm $c$ of the lever N.

V is a bearing or socket cast upon the slide T, in which socket V is a small sliding piece, $p$, which is so arranged that one end comes in contact with the face of the eccentric wheel U. Upon the other end of the slide $p$ is a piece or block, $q$, having one side inclined, as shown in Fig. 4.

W is an arm or projecting piece upon the inside of the slide T, which arm W extends through a slot or opening in the standard A', and the inner end of this arm W, or a piece, $r$, thereon, can come in contact with the inside of the lower end of the lever $e$, or with a pin or screw therein.

$s$ is a hollow arm extending out from the standard or frame A'.

$t$ is a sliding catch moving in the hollow arm $s$. The inner end of this catch $t$ is arranged to engage with a notch in the slide T, which notch is so located that when the slide is drawn out it will be held by the sliding catch $t$. (See Figs. 4 and 7.)

$u$ is a screw in the upturned end of the sliding catch $t$.

$v$ is a small piece fastened to the lower end of the lever S, which piece is arranged so that it can come in contact with the inner end of the screw $u$.

$w$ is a screw which passes through the lower end of the lever S. This screw has a ball upon its inner end.

$a'$ is a small block having a socket which receives the ball upon the end of the screw $w$. This block is arranged to come in contact with the part $q$.

$b'$ is a screw in a projection, $c'$, upon one end of the slide T, which screw is for the purpose of regulating the distance which the slide T moves when released from the catch $t$.

B' is a strong coiled spring, one end of which is secured to the main frame, and the other end is secured to the head $j$, which carries the cutter.

C', Fig. 5, is a strong coiled spring, one end of which is secured to the inside of the standard or end A' of the frame, and the other end is connected with a pin, $d'$, extending out from the projection $c'$ upon the slide T.

D' is another coiled spring, one end of which is connected to a fixed pin, $e'$, and the other end to a pin, $f'$, projecting down from the sliding catch $t$.

E' is another coiled spring, one end of which is secured to the lever S, near its lower end, and the other end is secured to the stud which carries the wheel U.

$g'$ is a pawl or catch pivoted to the main frame, and arranged to catch over the pins in the wheel U. (See Fig. 3.)

The leading-screw F may be made tapering, corresponding with the taper of the bushes or other article upon which the threads are to be cut; but this is not essential.

The operation is as follows: Supposing that screw-threads are being cut upon bung-bushes, a bush is placed upon the end of the spindle E, and secured by expansion thereof, or otherwise. By means of the lever J the operator then engages the clutch I with the projection upon the wheel H, which brings the shaft M and the lever N into the position shown in Figs. 2 and 3, in which position the arm $a$ of the weighted lever N will be partly over the opening in which the shaft N moves in the standard A', and, notwithstanding the action of the spring O, this arm $a$ of the lever will hold the shaft M in the position shown in Figs. 2 and 3. Motion will be given to the spindle E and bush R' by the moving shaft B, and during the first revolution of the spindle E the cam $d$, upon such spindle, will come in contact with the upper end of the lever $e$, throwing the upper end out, and causing the lower end of this lever $e$ to push the slide T out, as shown in Fig. 3. By this movement of the slide T the lower end of the lever S will be thrown a little to the right by the action of the piece $q$ upon the block $a'$, and the cutter $k$, having been first properly adjusted, will be thrown down so as to come in contact with the bush, and the follower $f$ will also be thrown down and engage with the leading-screw F, the head J, which carries the cutter, and the follower $f$ being both connected with the same rocking shaft, Q. At this time, when the cutting is to commence, the eccentric wheel U will be in the position shown in Fig. 3. As the leading-screw F revolves with the spindle E, the follower $f$, being engaged with such leading-screw, will travel gradually toward the right, causing the shaft Q to slide in its bearings, carrying with it the head $j$ and cutter $k$, and as the cutter travels over the face of the bush the lever S, being also secured to the chasing-bar Q, must move in the same direction, and the block $a'$ will travel on the inclined face of the piece $q$, which incline corresponds with the incline of the bush, and hence the cutter will be gradually lowered as it passes from one end of the bush to the other, and will cut all the way. During this operation the slide T will be held out in the position shown in Fig. 3 by the sliding catch $t$, which will then be engaged with a notch in the slide T. When the cutter reaches the end of the bush the end of the lever S, or the piece $v$ thereon, will come in contact with the inner end of the screw $u$, and will force the sliding catch $t$ outward, disengaging it from the notch in the slide T. Then, by the action of the spring C', the slide T, with the wheel U, pivoted thereto, will be carried to the left, looking at Fig. 3. At the same time the wheel U will be made to perform a part of a revolution, because the pawl $g'$ will then be engaged with one of the pins $l$. At the same time, by the action of the spring E', the lower end of the lever S will be carried to the left, looking at Fig. 3, which will raise the cutter $k$ away from the bush and the follower $f$ away from the leading-screw F, and then the action of the spring B' will move the cutter and the follower to the left, looking at Fig. 1, into proper position to commence the second cutting. Then the cam $d$, coming again in contact with the lever $e$, will cause it to move the slide T out again, at the same time throwing the lower end of the lever S to the right, as before, and bringing the cutter $k$ and the follower $f$ down. The cutter will now cut a little deeper than before, because the eccentric wheel U has been, as before stated, partially rotated, and another face of this wheel has been brought in contact with the end of the slide $p$, throwing the lower end of the lever S a little farther to the right than before, and consequently causing the cutter $k$ to cut a little deeper. When the cutter again reaches the end of the bush the operation before described will be again repeated—that is to say, the sliding catch $t$ will be released from the notch in the slide T, the spring C' will again act upon the slide, carrying it inward with the wheel U, giving this wheel another partial rotation, and bringing another pin $l$ into engagement with the pawl. The cutter and follower will also be lifted, as described, and be returned to the left, ready to repeat the operation.

The vertically-moving follower $f$ and the spring $i$ are important, because the cutter $k$ is brought with each successive cutting a little lower than before, and the head $g$ is correspondingly lowered, which could not be the case if the follower $f$ were rigidly secured thereto; but by making this follower vertically movable in the chamber in the head $g$, and providing the spring $i$, the follower becomes self-adjusting, rising a trifle in its chamber as the cutter is lowered.

As shown, the wheel U has eighteen pins and eighteen faces upon its periphery, which faces are eccentrically located, and with this construction there will be eighteen separate cuttings of the screw-thread before it is completed. Upon the full completion to the cutting, when the slide T returns and the wheel U is made to perform a partial revolution, bringing it back into the position shown in Fig. 3, the long pin $m$ will come in contact with the beveled end of the movable pin $n$ and force it inward, so that its then projecting end will come in contact with the lower end of the arm $c$ upon the weighted lever N, and will move such lower end of the arm $c$ a little to the left, which will cause the upper end of the arm $a$ to move to the right, (looking now at Fig. 3,) carrying it away from the opening in A', in which one end of the shaft M is located. At the same time, by the action of the spring O, the shaft M will be moved to the right, (looking now at Fig. 2,) disengaging the clutch from the wheel H, and the spindle E will then cease to rotate. The operator can then remove the completed bush and put another in place upon the end of the spindle E. Then by means of the lever J the clutch can be made to engage with the wheel H, as before, and the described operation will be repeated.

I do not limit myself to the use of the wheel U, having eighteen pins and faces. A greater or less number can be used, as required.

What I claim as new, and desire to secure by Letters Patent, is as follows:

1. The combination, with a chasing-shaft, Q, having longitudinal and rocking movements in its bearings, and a cutter, $k$, carried by one end of said shaft, of an arm, R, carried by the other end of the shaft, a follower, $f$, having a rod or pin, $h$, passing through the said arm, and a spring acting upon the inner end of the follower for permitting the latter to yield vertically to automatically adjust itself, substantially as described.

2. In a machine for cutting screw-threads, a chasing-bar, Q, carrying a cutter-head, $j$, and an arm or lever, S, upon one end and a follower, $f$, upon the other end, in combination with the spindle E, leading-screw F, cam $d$, lever $e$, slide T, and a device for holding the slide out, substantially as and for the purposes specified.

3. In a machine for cutting screw-threads, a chasing-bar, Q, carrying a cutter-head, $j$, and an arm or lever, S, upon one end and a follower, $f$, upon the other end, in combination with the spindle E, leading-screw F, cam $d$, lever $e$, slide T, wheel U, and a device for holding the slide out, substantially as and for the purposes specified.

4. In a machine for cutting screw-threads, the combination of a chasing-bar, Q, carrying a cutter, $k$, and lever S upon one end and a follower upon the other end, spindle E, leading-screw F, cam $d$, shaft M, levers $e$ and N, slides T and $p$, catch $t$, wheel U, provided with pins $l$, and faces eccentrically arranged, and springs B', C', D', and E', substantially as and for the purposes specified.

CHARLES E. ROBERTS.

Witnesses:
ALBERT H. ADAMS,
BERTHA A. PRICE.